US011500931B1

(12) United States Patent
Parchas et al.

(10) Patent No.: US 11,500,931 B1
(45) Date of Patent: Nov. 15, 2022

(54) USING A GRAPH REPRESENTATION OF JOIN HISTORY TO DISTRIBUTE DATABASE DATA

(71) Applicant: Amazon Technologies, Inc., Seattle, WA (US)

(72) Inventors: Panagiotis Parchas, Berlin (DE); Christos Faloutsos, Pittsburgh, PA (US); Anurag Windlass Gupta, Atherton, CA (US); Stavros Harizopoulos, San Francisco, CA (US); Michail Petropoulos, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 558 days.

(21) Appl. No.: 15/996,224

(22) Filed: Jun. 1, 2018

(51) Int. Cl.
*G06F 16/90* (2019.01)
*G06F 16/901* (2019.01)
*G06F 16/2455* (2019.01)
*G06F 16/2453* (2019.01)

(52) U.S. Cl.
CPC ...... *G06F 16/9024* (2019.01); *G06F 16/2456* (2019.01); *G06F 16/24544* (2019.01)

(58) Field of Classification Search
CPC .......... G06F 16/9024; G06F 16/24544; G06F 16/2456
See application file for complete search history.

(56) References Cited

U.S. PATENT DOCUMENTS

| | | | | |
|---|---|---|---|---|
| 10,282,350 B1* | 5/2019 | Pathak | ................... | G06F 16/21 |
| 2005/0234841 A1* | 10/2005 | Miao | ................. | G06F 16/24537 |
| 2009/0307329 A1* | 12/2009 | Olston | .................. | G06F 16/184 |
| | | | | 709/214 |
| 2011/0295907 A1* | 12/2011 | Hagenbuch | ............. | G06F 9/485 |
| | | | | 707/E17.005 |
| 2013/0311443 A1* | 11/2013 | Bolotnikoff | ....... | G06F 16/24534 |
| | | | | 707/714 |
| 2015/0154256 A1* | 6/2015 | McKenna | ......... | G06F 16/24542 |
| | | | | 707/718 |
| 2015/0242407 A1* | 8/2015 | Frohock | .................. | G06F 16/21 |
| | | | | 707/749 |

(Continued)

OTHER PUBLICATIONS

Anurag Gupta, et al, "Amazon Redshift and the Case for Simpler Data Warehouse", In Proceedings of the 2015 ACM SIGMOD International Conference on Management of Data, SIGMOD '15, pp. 1917-1923, New York, Ny, USA, 2015. ACM.

(Continued)

*Primary Examiner* — Alicia M Willoughby
(74) *Attorney, Agent, or Firm* — S. Scott Foster; Kowert, Hood, Munyon, Rankin & Goetzel, P.C.

(57) ABSTRACT

Using a graph representation of join history may be performed to distribute database data. Join history may be collected, captured, or tracked which describes the history of join operations between columns of different tables in a database. A graph representation of the join history may be generated. The graph representation may indicate a likelihood of different joins that may be performed between the columns of the tables of a database. An evaluation of the join history may be performed to identify columns for tables in the database to distribute the data of the tables amongst multiple storage locations according to the identified columns.

20 Claims, 9 Drawing Sheets

(56) References Cited

U.S. PATENT DOCUMENTS

| | | | |
|---|---|---|---|
| 2015/0347559 A1* | 12/2015 | Elias | G06F 16/9024 |
| | | | 707/737 |
| 2016/0026667 A1* | 1/2016 | Mukherjee | G06F 16/278 |
| | | | 707/714 |
| 2016/0055205 A1* | 2/2016 | Jonathan | G06F 16/2456 |
| | | | 707/714 |
| 2016/0179894 A1* | 6/2016 | Gupta | G06F 16/2456 |
| | | | 707/714 |
| 2016/0224579 A1* | 8/2016 | Porobic | G06F 16/134 |
| 2017/0185648 A1* | 6/2017 | Kavulya | G06F 16/24554 |
| 2017/0255675 A1* | 9/2017 | Chavan | G06F 7/24 |
| 2017/0371928 A1* | 12/2017 | Chainani | G06F 16/248 |
| 2018/0075101 A1* | 3/2018 | Amor | G06F 16/24553 |
| 2018/0075104 A1* | 3/2018 | Oberbreckling | G06F 16/221 |
| 2018/0113907 A1* | 4/2018 | Gulwani | G06F 16/258 |
| 2018/0173763 A1* | 6/2018 | Xia | G06F 16/2453 |
| 2018/0276252 A1* | 9/2018 | Zhang | G06F 3/0613 |
| 2019/0034486 A1* | 1/2019 | Bodziony | G06F 16/24537 |
| 2019/0171639 A1* | 6/2019 | Xu | G06F 16/283 |

OTHER PUBLICATIONS

R. Nehme, et al., "Automated partitioning design in parallel database systems", In Proceedings of the 2011 ACM SIGMOD International Conference on Management of Data, SIG MOD '11, pp. 1137-1148, New York, NY, USA, 2011, ACM.

C. Garcia-Alvarado, et al, "Automatic data placement in mpp databases", In 2012 IEEE 28th International Conference on Data Engineering Workshops, pp. 322-327, Apr. 2012.

J. Rao, et al, "Automating physical database design in a parallel database", In Proceedings of the 2002 ACM SIGMOD International Conference on Management of Data, SIGMOD '02, pp. 558-569, New York, NY, USA, 2002. ACM.

S. Agrawal, et al., "Integrating vertical and horizontal partitioning into automated physical database design", In Proceedings of the 2004 ACM SIGMOD International Conference on Management of Data, SIGMOD '04, pp. 359-370, New York, NY, USA, 2004. ACM.

S. Hougardy, "Linear time approximation algorithms for degree constrained subgraph problems", In Research Trends in Combinatorial Optimization, pp. 185-200. Springer, 2009.

Thomas Stöhr, et al, "Multi-Dimensional Database Allocation for Parallel Data Warehouse", In Proceedings of the 26th International Conference on Very Large Data Bases, VLDB '00, pp. 273-284, San Francisco, CA, USA, 2000. Morgan Kaufmann Publishers Inc.

J. Edmonds. "Paths, trees, and flowers", Canadian Journal of mathematics, 17(3):449-467, 1965.

C. Curino, et al, "Schism: A workload-driven approach to database replication and partitioning", Proceediongs VLDB Endow., 3(1-2):48-57, Sep. 2010.

* cited by examiner

*match-grow algorithm for evaluating a join graph 710*

Data: a *Join Multi-Graph* $G_Q = (V, E, w)$

Result: A column recommendation $R$
$R_1 \leftarrow \emptyset, R_2 \leftarrow \emptyset, E_R \leftarrow E, i \leftarrow 1$ // PHASE 1: Maximal Matching while $E_R \neq \emptyset$ do
    pick a random active vertex $u \in V$ with $deg_v \geq 1$
    while $u$ has a neighbor do
        $e \leftarrow (u.x, v.y)$ such that $w(e) \geq w(e') \forall e'$ incident to $u$
        $R_i \leftarrow R_i \cup \{(u, u.x), (v, v.y)\}$
        $i \leftarrow 3 - i$
        remove $v$ and incident edges from $V$
        $u \leftarrow v$
    end
end

//PHASE 2: Greedy Expansion

Let $R$ be the recommendation set ($R_1$ or $R_2$) with the greatest weight for $u \notin R$ do
    $e \leftarrow (u.x, v.y)$ such that $w(e) \geq w(e') \forall e'$ incident to $u$ with $(v, v.y) \in R$
    $R \leftarrow R \cup \{(u, u.x)\}$
end
return $R$

*FIG. 7A*

USING A GRAPH REPRESENTATION OF JOIN HISTORY TO DISTRIBUTE DATABASE DATA

BACKGROUND

As the technological capacity for organizations to create, track, and retain data continues to grow, a variety of different technologies for managing the rising tide of information have been developed. Databases and other data store technologies, for example, have implemented support for querying languages and protocols that allow users to search for and modify data stored in a large data set by submitting queries. Because the amount of data accessed by queries is growing, minimizing the amount of time and other resources consumed to perform queries is increasingly important.

Database and other data store technologies may distribute large data sets across multiple storage locations in order to perform queries or other data operations in parallel. However, the location of data among the multiple storage locations can significantly impact the performance of queries that may access data at multiple locations. For example, if similar values are co-located in similar storage locations, then fewer storage locations may need to be accessed in order to perform a query. Therefore, techniques that identify and distribute data among the multiple locations to improve the performance of queries are highly desirable.

BRIEF DESCRIPTION OF THE DRAWINGS

FIG. 7A is an example technique for evaluating a graph representing join history between database tables to select columns for distributing database data, according to some embodiments.

Figure 1:
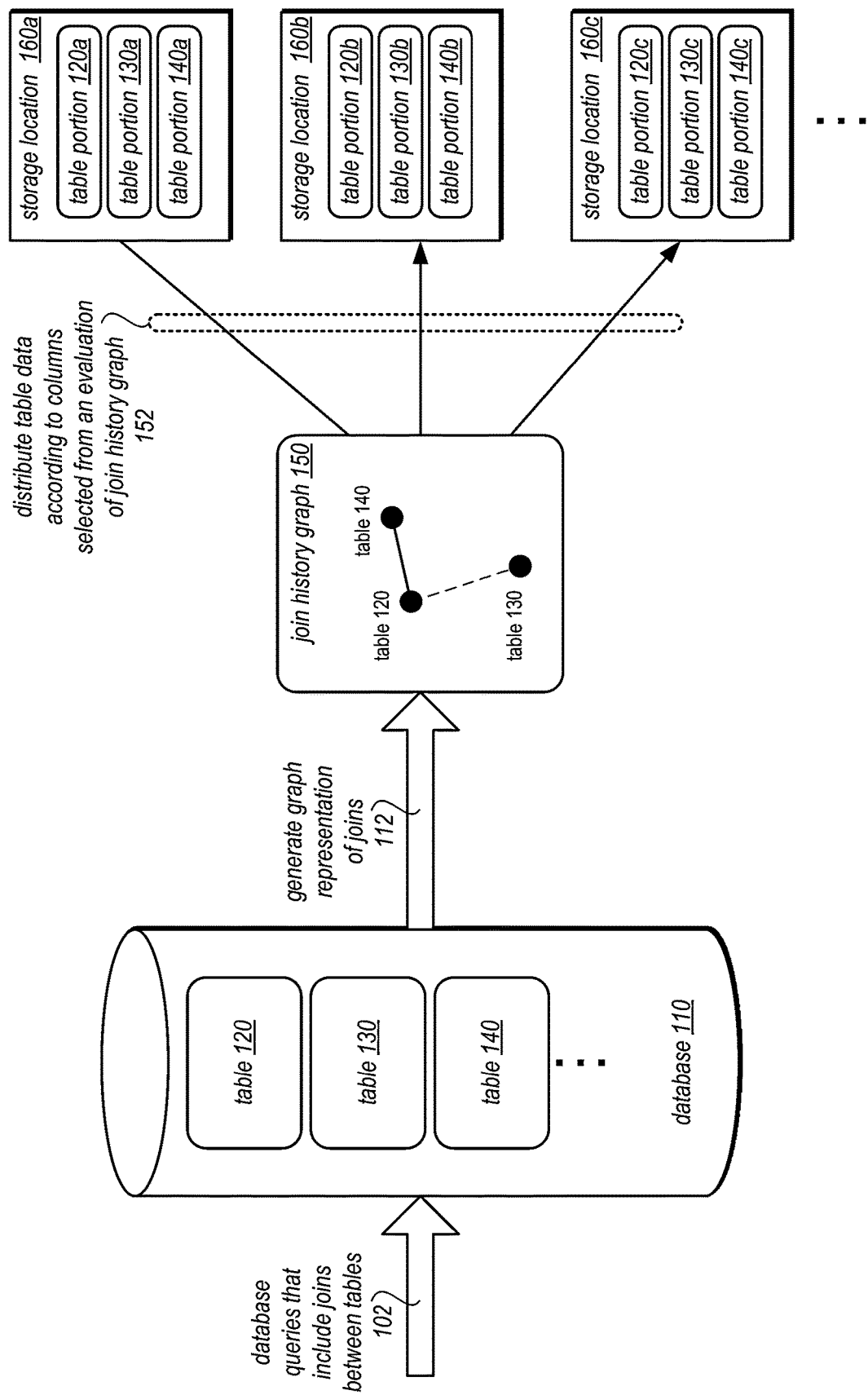
FIG. 1 illustrates a logical block diagram of using a graph representation of join history to distribute database data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of using a graph representation of join history to distribute database data are described herein. Database data may be distributed amongst multiple nodes, hosts, servers, or other storage locations in order to take advantage of parallel processing optimizations, in various embodiments. For example, a database query directed to a database that is distributed in multiple locations may divide the work of the query into different portions to be performed at different storage locations storing database data so that work to perform the query may be performed concurrently or in parallel (or near parallel) at the different storage locations (instead of performing the query serially which could greatly increase the amount of time or other costs to perform the query), in some embodiments). In order to distribute database data, a distribution scheme may be implemented that assigns portions of different database data (e.g., from different database data tables) to the different storage locations, in various embodiments. In this way, query or other operations that access the database can take advantage of the optimal distribution of data amongst the locations to perform the query or other operations, in some embodiments.

Some database operations, such as joins, may operate on data from different tables in a database, in various embodiments. For example, a query may join records from Table A where a column from table A matches a value of a column in Table B (e.g., "SELECT*FROM table_A JOIN table_B ON table_A.col1=table_B.col2"), in some embodiments. Because the results to be returned by the query are joined from different tables, the performance of the join may be greatly increased if the same values of the columns to be joined are co-located in the same storage locations (instead of storing column values to be joined that are not the same which could result in sending data from one storage location to another in order to identifying matching records in a table which would increase communication, processing, and other costs to perform queries), in some embodiments. Using a graph representation of join history to distribute database data may be implemented in order to identify columns that are likely to be joined, in various embodiments, so that similar column values from columns likely to be joined can be co-located.

As the number of columns and tables in a database can grow very large, a graph representation of join history can provide an efficient search structure for identifying those columns in database tables that are likely to be joined, in various embodiments, allowing for real-time recommendations for automated distribution operations or to provide users with fast and reliable recommendations. A graph representation of join history can be implemented independent of database engine type (e.g., independent of database engine analytical or other features), database schema (e.g., independent of a star or snowflake schema), or size of database (e.g., independent of the number/size of tables), in various embodiments, so that different types, sizes, architectures, or other features of databases that store data across multiple storage locations can be quickly and reliably evaluated and distributed to maximize co-location of data for join operations. FIG. 1 illustrates a logical block diagram of using a graph representation of join history to distribute database data, according to some embodiments.

Database 110 may include multiple database tables, such as tables 120, 130 and 140, in some embodiments. Database 110 may be a relational, non-relational, or other data store that allows query operations to join data from different tables (e.g., a collection of data records, items, or objects), in some embodiments. As indicated at 102, database queries that include joins between tables may be performed with respect to database 110. The join operations may be recorded, collected, or otherwise tracked in a join history that may be used to generate, as indicated at 112, a graph representation of joins in the history, as indicated at 150. Join history graph 150 may be generated in different ways. For example, FIG. 6, discussed below illustrates the generation of a join history graph that adds edges (or increases their weight) between nodes representing the tables (e.g., as illustrated in FIG. 1 representing tables 120, 130, and 140) and columns (or other attributes, values, fields, etc.) upon which the tables are joined. The relationship between the tables, columns, and joins represented in the graph may provide a likelihood or other probability that a join may be performed on a column in a table. In some embodiments, the relationships in join history graph 150 may further represent the work or cost savings that may be obtained for column.

An evaluation of join history graph 150 may be performed to select columns in tables according to join probability (and/or other criteria, such as cost to perform the join, or a combination of criteria), in some embodiments. Graph matching algorithms may, for instance be performed in order to solve for the combination of selected columns that maximizes (or approximates the maximized) the likeliest (and/or costliest) columns to be joined for each table to use for distributing the tables data so that the values of the selected columns are collocated to improve join performance. In some embodiments, other search or evaluation techniques for graphs to identify a column (or other attribute) for each table upon which to distribute the tables in the database may be identified.

As indicated at 152, the table data may be distributed according to columns selected from an evaluation of join graph history into different storage locations, such as storage locations 160*a*, 160*b*, 160*c* and so on. Storage locations 160 may be different physical or logical hosts, servers, nodes, partitions, or other separately accessed or processed portions of table data. For example table portions 120*a*, 120*b*, and 120*c* may be identified and stored according to the selected column for table 120, table portions 130*a*, 130*b*, and 130*c* may be identified and stored according to the selected column for table 130, and table portions 140*a*, 140*b*, and 140*c* may be identified and stored according to the selected column for table 140, in some embodiments.

Please note that the previous description of using a graph representation of join history to distribute database data is a logical illustration and thus is not to be construed as limiting as to the implementation of a database, table, join history graph, storage location query, distribution, or portions thereof, or other illustrated features.

This specification begins with a general description of a provider network that implements database services (or other data storage or processing services to allow performance of joins across tables or other data objects) and other services that may implement or utilize using a graph representation of join history to distribute database data. Then various examples of one such database service, including different components/modules, or arrangements of components/module that may be employed as part of implementing the techniques are discussed. A number of different methods and techniques to implement using a graph representation of join history to distribute database data, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
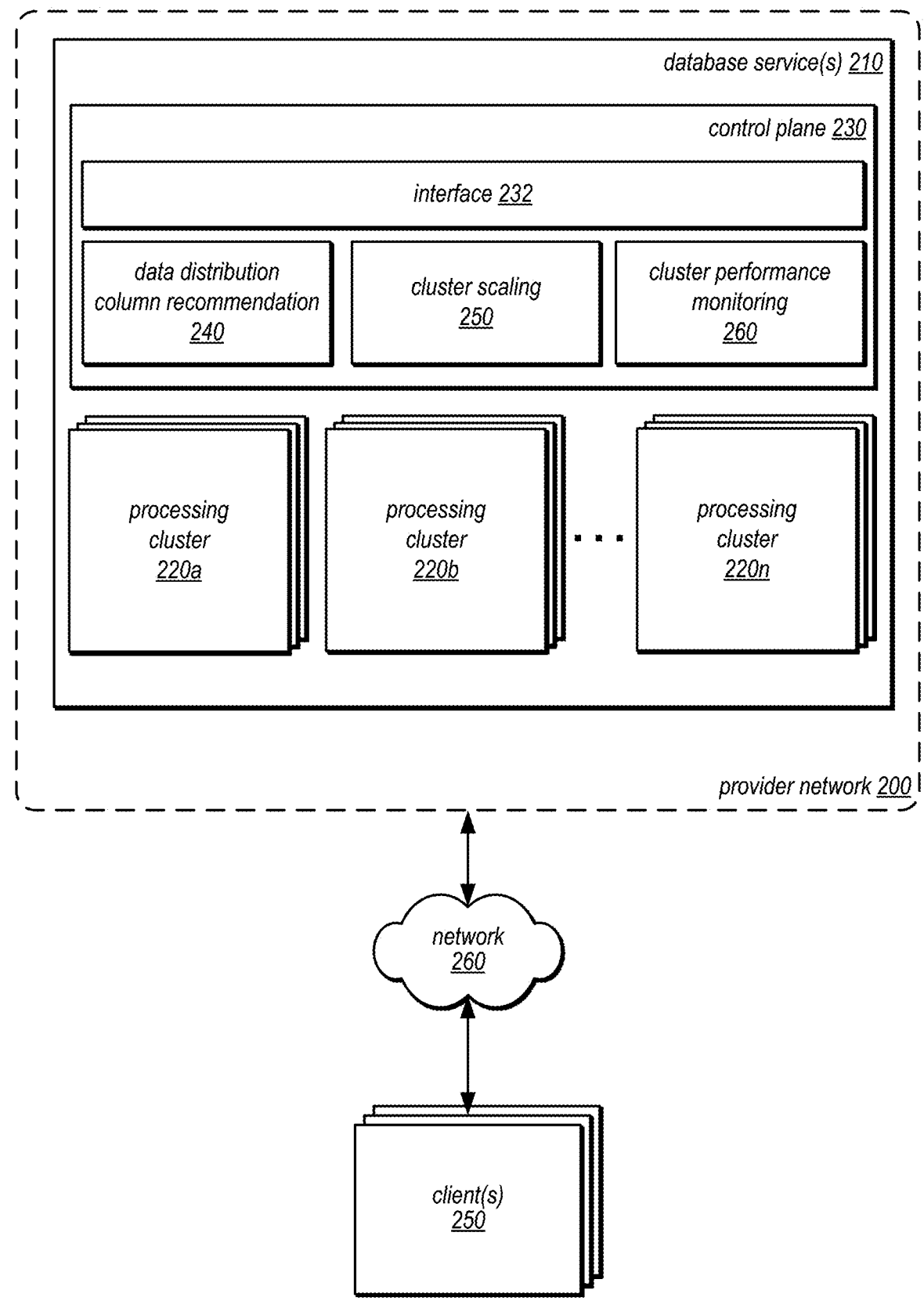
FIG. 2 is a logical block diagram illustrating a provider network offering a database service that implements using a graph representation of join history to distribute database data hosted in the provider network, according to some embodiments.

FIG. 2 is a logical block diagram illustrating a provider network offering a database service that implements using a graph representation of join history to distribute database data hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services that are not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 or other network services 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 or other services 240 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) that may be accessible to a query engine implemented as part of database service(s) 210).

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). A database service, such as database service 210, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 8, in some embodiments. Different subsets of these computing devices may be controlled by control plane 230. Control plane 230, for example, may provide an interface 232 to clients or users who wish to interact with the processing clusters 220 managed by control plane 230. For example, interface 232 may implement one or more Application Programming Interfaces (APIs) to allow client systems to programmatically invoke database service operations, functions, or other features and/or interface 232 may implement or provide one or more graphical user interfaces (GUIs) for storage clients (e.g., as a web-console). Interface 232 may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query. As discussed below, a user may request a recommendation for columns of tables in a database for distribution and/or invoke distribution (or redistribution) according to the recommended columns, in some embodiments.

In at least some embodiments, control plane 230 may implement cluster performance monitoring 260, which may track, store, organize and/or evaluate performance metrics collected for queries performed at processing clusters 220. For example, performance monitoring 260 may receive reported metrics from a leader node (as discussed below with regard to FIG. 3, and store them in a common storage location (e.g., in a file, direct, or object within a storage service) for the database (or user account associated with the database). In some embodiments, performance monitoring 260 may evaluate processing cluster performance in order to trigger the performance of various control plane 230 operations (e.g., node replacement or failover operations). In some embodiments, cluster scaling 250 may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 directly (e.g., without sending requests to control plane 230) to obtain data warehouse services, in some embodiments. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. Control plane 230 may direct scaling operations, as discussed above, to right-size a processing cluster 220 for efficiently processing queries.

Figure 3:
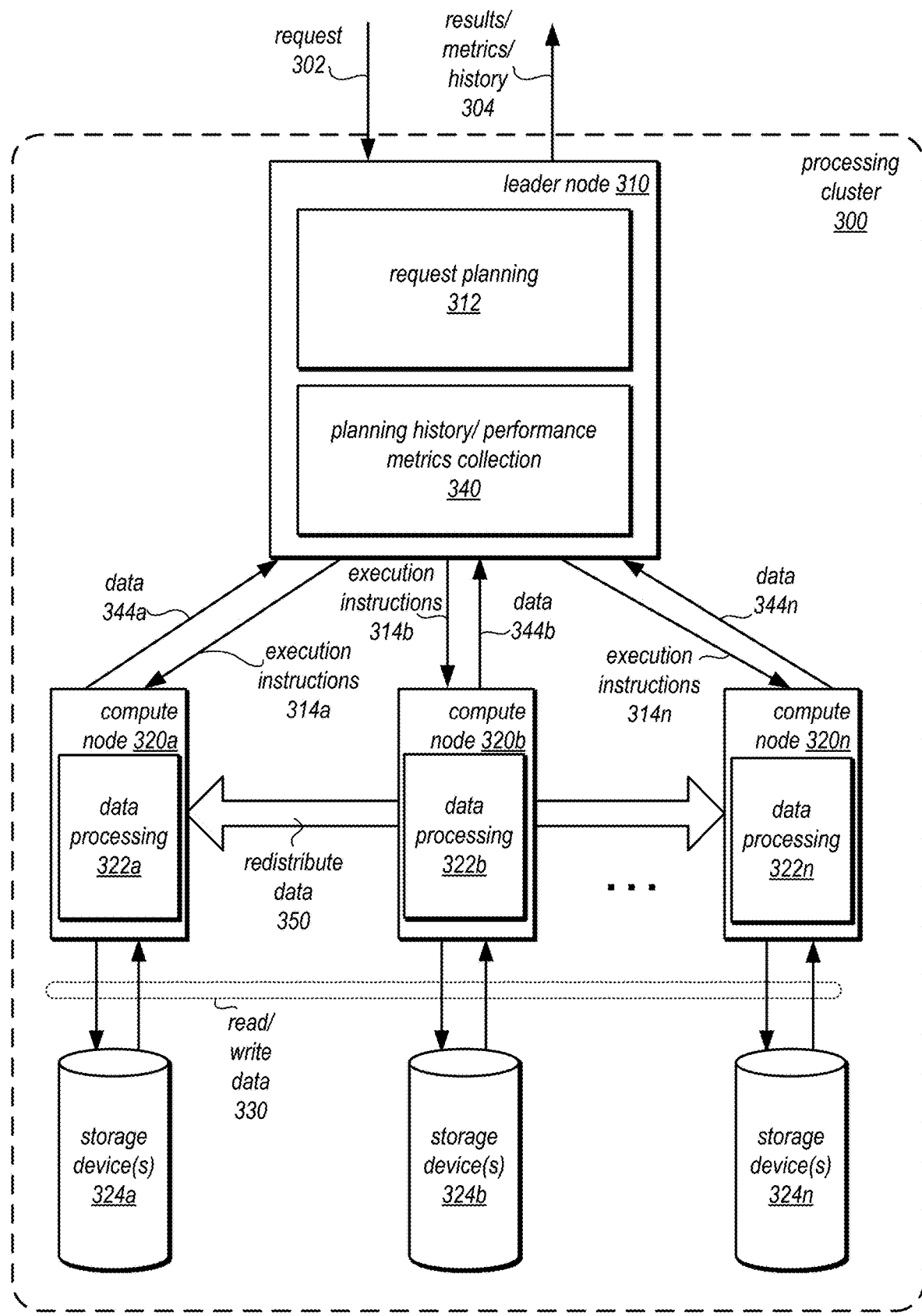
FIG. 3 is a logical block diagram illustrating a processing cluster of a database service that accesses data distributed or redistributed according to a graph representation of join history, according to some embodiments.

FIG. 3 is a logical block diagram illustrating a processing cluster of a database service that accesses data distributed or redistributed according to using a graph representation of join history, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over an interconnect (not illustrated), in one embodiment. Leader node 310 may implement request planning 312 to generate plan(s) and instructions 314 for executing various requests 302, such as query that performs various operations including a join, requests to update, add, modify, or remove data, requests to redistribute data according to identified columns, on processing cluster 300, in one embodiment. Leader node 310 may implement planning history/performance metric collection 340 to collect and report performance metrics collected for various events, units of work, or other portions a query or other operation's performance, compute node or leader node performance, and history of operations performed, such as join history which may be provided to generate join history graphs from a live database, in some embodiments. As described herein, each node in a processing cluster 300 may include attached storage, such as storage device(s) 324a, 324b, and 324n, on which a database (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Request 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 8, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing granular performance analysis for database queries.

In some embodiments, compute nodes 320 may perform various operations to redistribute data 350. For example, recommend columns determined according to a graph representation of join history, as discussed below, may be identified and used to redistribute data amongst compute nodes 320 (e.g., by apply a hash function to values of the identified columns (e.g., distribution keys) in order to store data at a compute node with an assigned range of hash values that includes the hash value computed for the data to be stored. Compute nodes 320 may perform various communications to exchange, move, relocated, and/or otherwise change the distribution of a database hosted in processing cluster 300 according to the recommended distribution columns, in some embodiments.

Storage device(s), such as storage devices 324*a*, 324*b*, and 324*n*, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
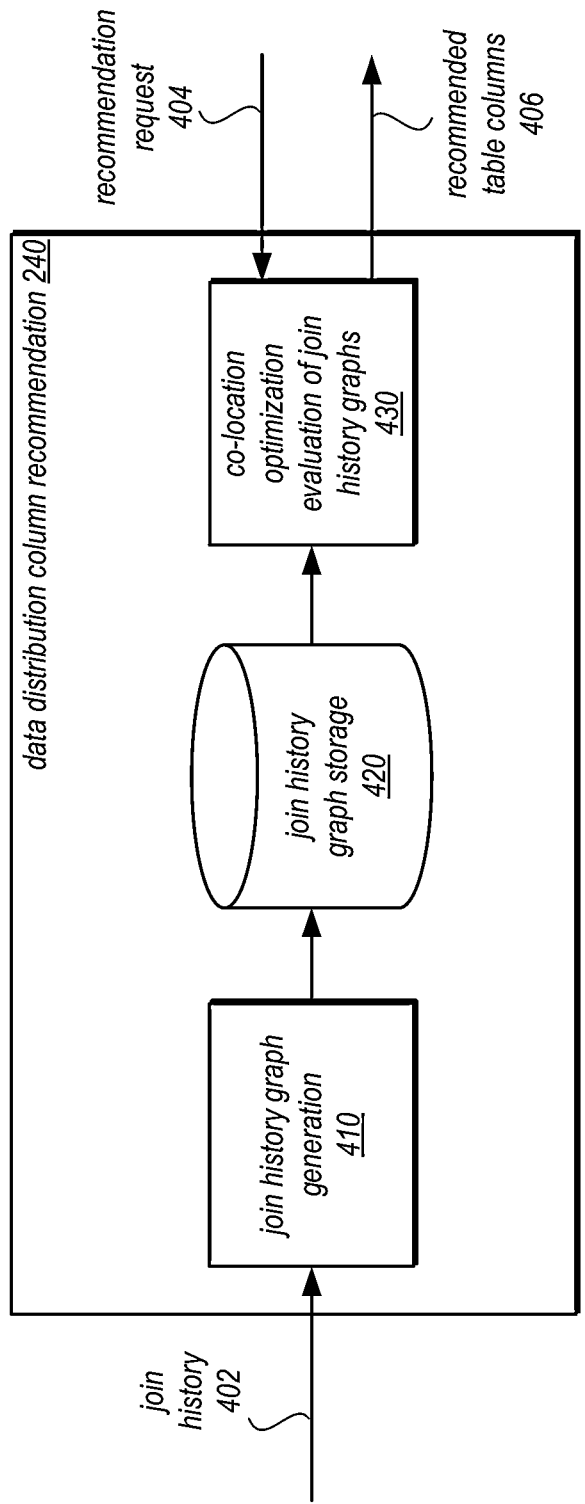
FIG. 4 is a logical block diagram illustrating data distribution column recommendation that evaluates join history represented as a graph to recommend table columns for distribution, according to some embodiments.

FIG. 4 is a logical block diagram illustrating data distribution column recommendation that evaluates join history represented as a graph to recommend table columns for distribution, according to some embodiments. Data distribution column recommendation 240 may be implemented as part of the control plane for a database service, as a downloadable tool or application separate from the database service, or other system that can obtain join history and interact to respond to recommendation requests, in some embodiments.

Figure 6:
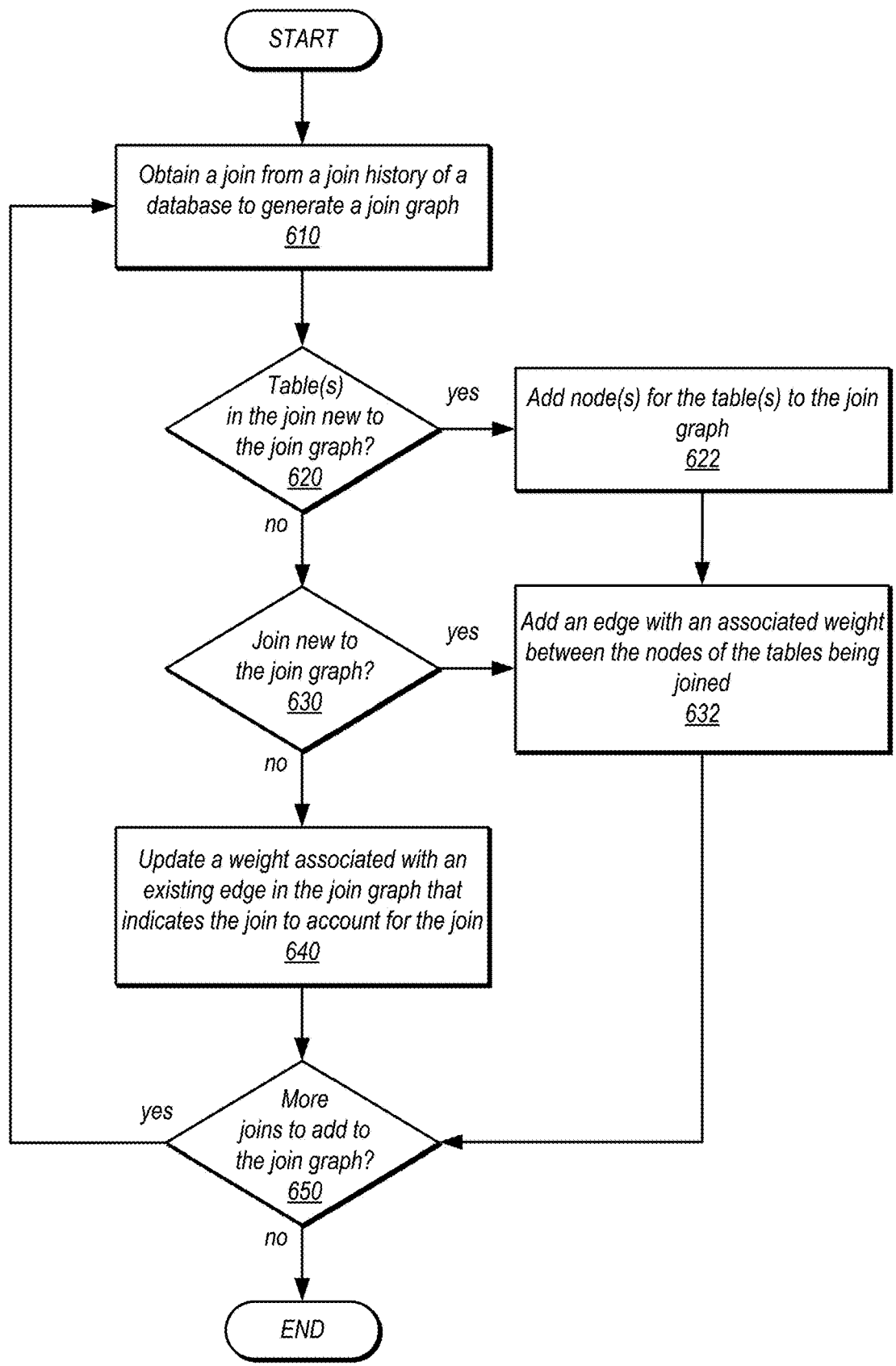
FIG. 6 is a high-level flowchart illustrating methods and techniques to generate a graph representing join history between tables of a database, according to some embodiments.

Data distribution column recommendation 240 may obtain join history, as indicated at 402. Join history 402 may be provided as a stream of join operations performed for a database, or as a batch, in some embodiments. For example, join operations for a database may be reported and sent to data distribution column recommendation 240 from processing clusters (e.g., from processing clusters 220 in FIG. 2) as the joins are performed, or may be provided as a file or other data object that includes records of past joins performed (which may also be submitted from a user that is moving a database to database service 210 but is not yet hosted in database service 210), in some embodiments. Join history graph generation 410 may apply various graph generation techniques to represent the tables and columns joined. FIG. 6 provides various example techniques which may be performed by join history graph generation 410 in some embodiments.

Once graphs representing the join history are generated, the graphs may be stored, maintained, or written to join history graph storage 420. Join history graph storage 420 may be located in database service 210 or in a separate storage service or system, in some embodiments. Graphs for different databases may be stored and separately accessible, in some embodiments. For instance, graphs may be updated by join history graph generation to generate a separate and new graph representing join history for a database as updated join history is received, or a current graph may be overwritten or updated in place as updated join history is received. In either scenario, a current or updated join graph is accessed from join history graph storage 420 in order to provide a graph for evaluation, in some embodiments. Although not illustrated, in at least some embodiments, some graphs representations may be uploaded or provided to join history graph storage 420 so that join graph generation is not performed.

Co-location optimization evaluation for join history graphs 430 may access graphs in join history graph storage 420 in order to perform evaluations to select columns to recommend for distributing database data, in various embodiments. FIG. 7 provides an example evaluation technique that may be performed, in some embodiments. Other searching or graph evaluation techniques that can, for instance, maximize the sum value of weights/costs/probabilities of joins being performed for columns of tables in a given database may be performed, in some embodiments. Other searching and/or evaluation techniques may be performed to optimize the amount of co-located data according to the weights, probabilities, or other indications of the join history graph, in some embodiments.

Co-location optimization evaluation for join history graphs 430 may respond to recommendation requests 404 and provide an indication in return, as indicated at 406 that identifies columns (or other attributes) for each table (or identified/requested tables) in a database to use for distributing the data of that table, in some embodiments. Recommendation requests 404 may be received from users of a database service or control plane features or components that performed automated operations to distribute (e.g., upon loading of data) or redistribute database data, in some embodiments.

Figure 5:
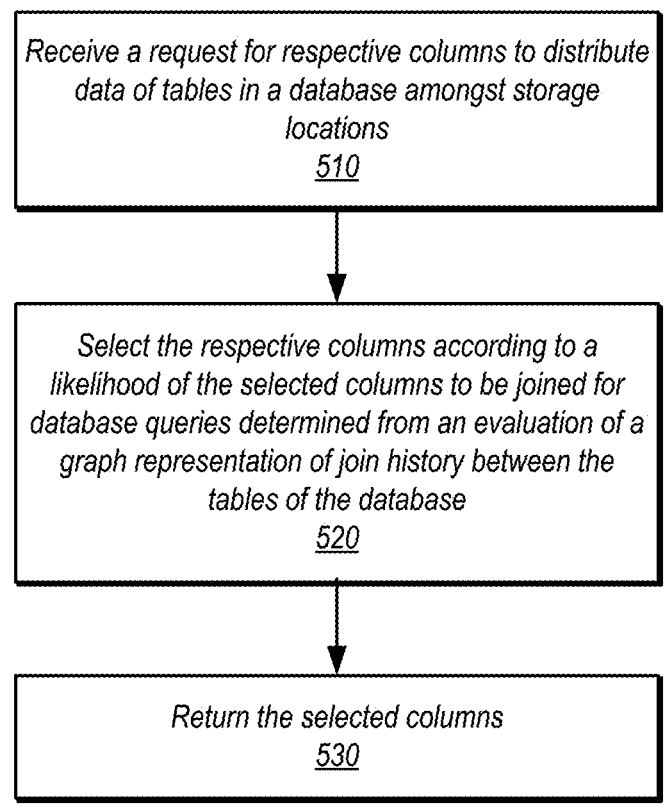
FIG. 5 is a high-level flowchart illustrating methods and techniques to implement using a graph representation of join history for distributing database data, according to some embodiments.

Although FIGS. 2-4 have been described and illustrated in the context of a provider network implementing a database service, the various components illustrated and described in FIGS. 2-4 may be easily applied to other data processing or storage systems that perform queries that include joins to databases stored across multiple locations. As such, FIGS. 2-4 are not intended to be limiting as to other embodiments of using a graph representation of join history for distributing database data. FIG. 5 is a high-level flowchart illustrating methods and techniques to implement using a graph representation of join history for distributing database data, according to some embodiments. Various different systems and devices may implement the various methods and techniques described below, either singly or working together. For example, a processing cluster, control plane component, or other analysis component may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 510, a request for respective columns to distribute data of tables in a database amongst multiple storage locations may be received, in various embodiments. The request may, for instance, be a request received from a user via an API and/or GUI interface for a database that is already stored at the storage locations or to be stored amongst the storage locations, in some embodiments. The techniques described below may be applicable when migrating or moving a database from one database service, system, or platform to another, which may allow for the opportunity to redistribute data in a different manner than the database was previously stored. The request may be received from a control plane or other automated operation, in some embodiments. For example, an operation that adds or removes storage locations (e.g., changing a number of compute nodes in a processing cluster) may trigger a request for a recommendation for respective columns to distribute amongst the storage locations inclusive of the changed to the storage locations. In some embodiments, an operation that is performed as part of uploading additional data to the database (or data for a new database) may trigger the request. In some embodiments, clean-up, vacuum, or other operations that reshuffle data may trigger the request for column recommendations. In some embodiments, query performance that includes joins and/or collecting a threshold amount of join history (e.g., 11,000 join operations) may trigger the request to recommend columns.

As indicated at 520, the respective columns of may be selected according to a likelihood of the selected columns to be joined for database queries determined from an evaluation of graph representation of join history between the tables of the database, in various embodiments. For example, as discussed below with regard to FIG. 6, the greater number of the same join performed may increase the weight of the edge in the graph representation so that a maximization matching technique may be applied to search the graph representation and identify those joins that are most likely to be performed based on the associated weight of the edges, in some embodiments. Additional information for the join operations, such as the amount of work or cost to be saved may be incorporated into the weight when performing the maximizing match evaluation on the graph (or may be applied as a second stage of analysis separate from the matching technique), in some embodiments. FIG. 7, discussed below provides further examples of evaluation techniques, in some embodiments.

As indicated at 530, the selected columns may be returned, in various embodiments. For example, the selected columns may be identified according to key or other identifier for the columns so that each table has one identified column, in some embodiments. The column recommendations may be returned to and incorporated into automated distribution workflows or operations (e.g., uploading new data into the database by applying a hash function to the identified column values of the tables, redistributing existing data amongst the same or different storage locations, etc.) which may be performed by a database service or system in order to provide users with optimal data distributions without user intervention to cause the redistribution or initial distribution, in some embodiments.

In order to represent join history of database as a graph, different features of databases, queries, and other information may be represented in various ways. For example, a set Q, where $Q=\{q_1, q_2, \ldots q_n\}$ may be the history of queries to a database that includes multiple tables, in some embodiments. Each query may have more than one join, $q_i=\{j_{i1}, j_{i2}, \ldots j_{im}\}$, in some embodiments. Each join may be represented by the set of tables it joins $(t_{i1}, t_{i2})$ the corresponding join columns $(c_{i1}, c_{i2})$ and the weight of the join $(w_i)$ (which could be represented by the number of processed bytes to perform the join and/or other cost), so that a join may be represented as $j_{ik}=<t_{k1}, t_{k2}, c_{k1}, c_{k2}, w_k>$. In various embodiments, co-located joins may occur when $t_{k1}$ and $t_{k2}$ are distributed on $c_{k1}$ $c_{k2}$.

In various embodiments, the join history may be represented as a weighted, undirected multi-graph, which may be denoted as $G_Q=(V, E, w)$, where V corresponds to the set of tables in the cluster (or a subset of tables to be distributed) and E contains an edge for pairs of tables that have been joined at least once in Q. The column set $A_u$ of a vertex (or node) where $u \in V$ correspond to the set of u's columns that have been used to join at least once in Q, in some embodiments. Each edge in the graph, $e=(u.x, v.y)$ with $\{u, v\} \in V$, $x \in A_u$, and $y \in A_u$ corresponds to the joined columns x and y of tables u and v respectively, in some embodiments. The weight $w(e): E \to \mathbb{R}^+$ may represent the cumulative number of bytes that were processed during that join, throughout the join history, in some embodiments. For example, if a join occurred more than once, the weight of the edge corresponding to the join may correspond to the summation of bytes processed during each iteration of that join, in some embodiments. Other units or criteria may be applied in addition to or instead of the prior example in order to determine weight in other embodiments. Because tables may be joined on more than one column, a graph may have parallel edges (as illustrated in FIG. 7), in some embodiments.

A graph representation as discussed above may be updated to include new join history or changes in data (e.g., additional tables), as updates to the graph can be incrementally performed. FIG. 6 is a high-level flowchart illustrating methods and techniques to generate a graph representing join history between tables of a database, according to some embodiments. As indicated at 610, a join may be obtained from a join history of a database (e.g., submitted as a file, log, or stream of join history as joins occur) to generate a join graph, in some embodiments. If the join includes a table not currently represented in the join graph, as indicated at 620, then a node (or vertex as described above) may be added to the graph for the new table(s) (which may be one or two new tables, in some embodiments, as indicated at 622. If the join is new to the graph, as determined at 630, then an edge may be added between the nodes of the tables being joined, as indicated at 632. For example, a new join may be a join between columns (or other attributes) between two tables where at least one of the columns has not been represented in a join. In some scenarios, a new join could be a join between two tables that already exist in the graph, but have not been joined on an attribute at one or both of the tables before. A weight may be determined or associated with the edge (e.g., based on bytes read, size of table, or other information descriptive of the join), in some embodiments. If the join is not new, then a weight associated with an existing edge in the join graph that indicates the join may be updated to account for the join, as indicated a 640, in various embodiments. For example, the weight of the new join may be added to the total weight for the edge, in some embodiments. The technique may be repeated if more joins remain to be added, as indicated by the positive exit from 650, in some embodiments. Join graphs that have already been evaluated to provide recommended columns can be updated (e.g., incrementally or for multiple joins) and the evaluation performed again, in some embodiments (which may result in different recommendations in some scenarios).

FIG. 7A is an example technique for evaluating a graph representing join history between database tables to select columns for distributing database data, according to some embodiments. Match-grow algorithm 710 may be implemented for evaluating a join graph (e.g., a join graph generated according to the techniques discussed above). The algorithm may rely upon similar notation to that discussed above to describe the various features of the algorithm. Consider again the graph $G_Q=(V, E, w)$. Let $r_u$ be an element of u's attribute set, i.e., $r_u \in A_u$. The pair $u:r_u$ may be the vertex recommendation of u and the total recommendation R as the union of all vertex recommendations, which may be denoted as $R=U_{u \in v}(u.r_u)$, in some embodiments.

Note that in some embodiments, each vertex can have at most one vertex recommendation in R. In some embodiments, the weight $W_R$ of a total recommendation R may be the summation of all weights of the edges whose endpoints belong in R, which may be denoted as $WR=\Sigma(w(e))$ where $e=(u.x, v.y)$ and $r_u=x$, $r_v=y$. In some embodiments, the weight of a recommendation may correspond to the weight of the collocated joins that R would produce, if all tables u $\in$ R were distributed using the identified columns. Techniques that evaluate the join history graph may maximize the weight of the recommendation, in some embodiments.

Match-grow algorithm 710 may be implemented in two phases, in some embodiments. The first phase may maintain two recommendations, $R_1$ and $R_2$ that are initially empty, in some embodiments. At each iteration of the outer loop, a vertex may be randomly picked with a degree of at least one (e.g., where the degree of any vertex $u \in V$ equals to the cardinality of u's attribute set, $\forall u \in V$, deg (u)=|Au|, so that a join involving a table u in Q is using different join attributes than all other joins that involve u). Then, from all edges incident to u, it picks the heaviest one according to the edge's weight (e.g., e=(u.x,v.y)) and assigns the corresponding endpoints (i.e., (u,x) and (v,y)) to $R_i$. Then the process is repeated for vertex v and recommendation $R_{3-i}$ until no edge can be picked, in some embodiments. In this way, phase 1 may extract two heavy alternating paths and assign their corresponding edges to recommendations $R_1$ and $R_2$ respectively, in some embodiments. At the end of Phase 1, let recommendation R be the recommendation set with the greatest or largest weight (of $R_1$ or $R_2$), in some embodiments.

Phase 2 may extend the recommendation, in some embodiments, by greedily adding more vertex recommendations. For example, for each vertex u that does not belong to R, the algorithm may pick the heaviest edge (e.g., e=(u.x,v.y)) that is incident to u and has the other endpoint (e.g., (v.y)) in R. Then, the algorithm may expand the recommendation by adding (u.x). Since all edges are considered at most once, the complexity match-grow algorithm 710 may be O(E) with a performance ratio of ½, in some embodiments.

Figure 7B:
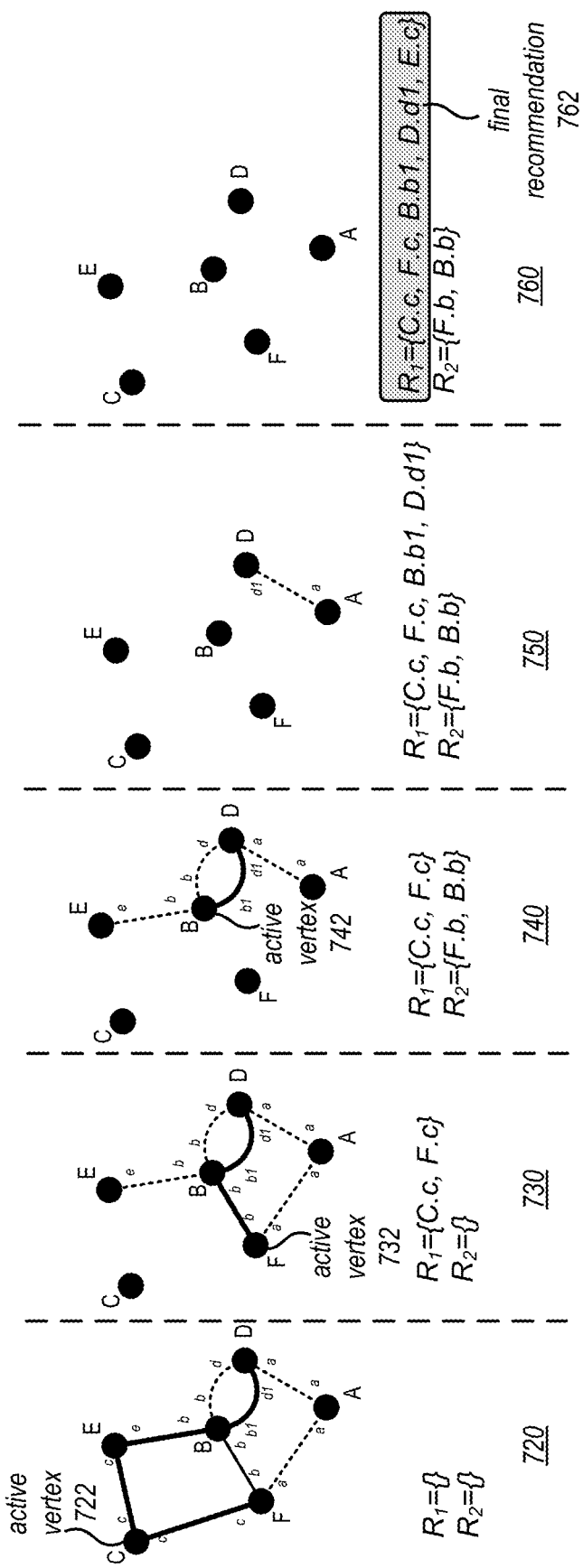
FIG. 7B is a series of illustrations that describe an example technique for evaluating a graph representing join history, according to some embodiments.

Scenes 720 through 760 in FIG. 7B may illustrate an application of match-grow algorithm 710 for different iterations of phase 1. Initially, both recommendations (e.g., $R_1$ and $R_2$) are empty, in 710. Then, C may be chosen as the active vertex 722. The heaviest edge incident to C may be selected (where the solid line is heavier than the dotted line), (C.c, F.c) and adds (C.c), (F.c) in $R_1$, while removing all incident edges of C from the graph, as illustrated in scene 730. Then the active vertex becomes F as indicated at 732 in scene 730. Since W(F.b,B.b)>W(F.a,A.a) (because the solid line is heavier than the dotted line), $R_2$ becomes (F.b,B.b) and the edges incident to F are removed, as illustrated in scene 740. Scene 750 may illustrate recommendations at the end of Phase 1. $R_1$ is the heaviest of the two recommendation sets, with W($R_1$)>W($R_2$), thus R=$R_1$. Scene 760 may illustrate phase 2. Because vertex E is not included in either recommendation set at the end of phase 1 (see $R_1$ and $R_2$ in 750), and because vertex E has the heaviest incident edge in the graph (illustrated in scene 720). Thus, as illustrated in scene 760 the final recommendation 762 becomes R={(C.c), (F.c), (B.b1), (D.d1), (E.c)}.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of using a graph representation of join history for distributing database data as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 8:
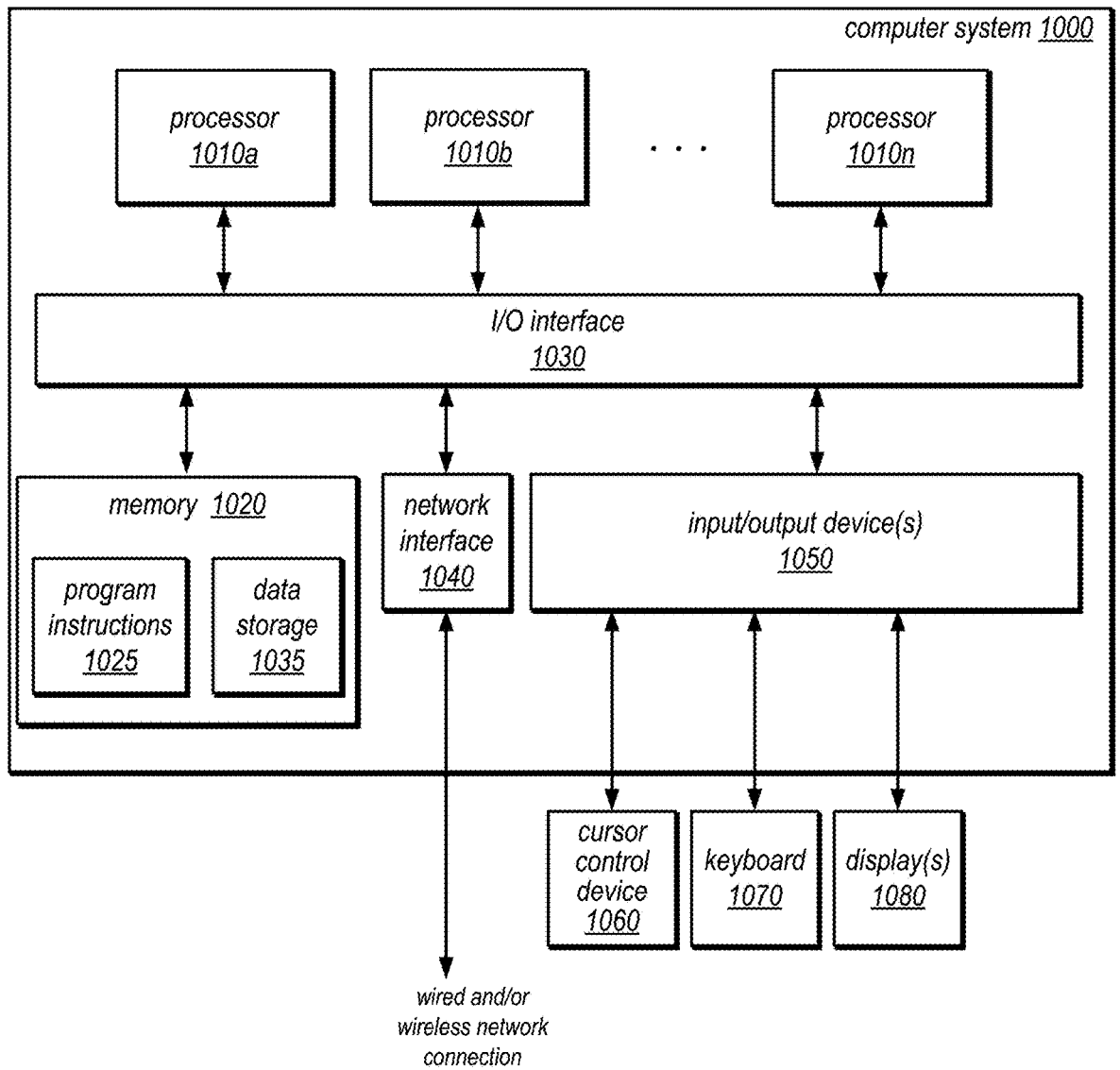
FIG. 8 illustrates an example system to implement the various methods, techniques, and systems described herein, according to some embodiments.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions to be performed by at least one processor which cause the at least one processor to perform a method to at least:
obtain join history between a plurality of tables of a database, wherein the plurality of tables respectively comprise two or more columns;
generate a graph representation of the join history, wherein the graph representation of the join history comprises,
a representation of those tables of the plurality of tables of the database that are associated with one or more joins of the join history,
a representation of join columns of those tables that are associated with the one or more joins, and
a representation of one or more weights between the join columns of those tables that are associated with the one or more joins;
receive a request that causes a selection of one respective column from each of the plurality of tables to distribute data of the plurality of tables across each of a plurality of nodes in a cluster according the one respective column;
evaluate the graph representation to determine a likelihood of individual ones of the two or more columns from different ones of the plurality of tables to be joined for database queries, wherein the evaluation of the graph representation evaluates the representation of the join columns of those tables that are associated with the one or more joins and the representation of the one or more weights between the join columns of those tables that are associated with the one or more joins;
select, based on the evaluation, the one respective column from each of the plurality of tables as respective distribution columns of the plurality of tables that increase the amount of same values of the selected columns in co-located data for subsequent join operations at the plurality of nodes according to the determined likelihood; and
return respective identifiers of the selected columns.

2. The system of claim 1, wherein to generate the graph representation of the join history, the program instructions cause the at least one processor to perform the method to at least create or update an edge in the graph for respective joins in the join history between respective tables joined in the join history, wherein the creation or update of the edge associates a weight value for the edge in the graph.

3. The system of claim 2, wherein to evaluate the graph representation, the program instructions cause the at least one processor to perform the method to at least including alternating between different recommendation sets to include a heaviest value of a weight value incidental to a randomly selected node in the graph, wherein columns identified in a recommendation set with a total heaviest value are identified as the selected columns.

4. The system of claim 1, wherein the cluster is implemented as part of a database service of a provider network that hosts the database for a user of the provider network.

5. A method, comprising:
responsive to a request that causes a selection of one respective column from each of a plurality of tables to distribute data of the plurality of tables in a database across each of a plurality of storage locations according to the one respective column, wherein the plurality of tables respectively comprise two or more columns:
evaluating a graph representation of join history to determine a likelihood of individual ones of the two or more columns from different ones of the plurality of tables to be joined for database queries, wherein the graph representation comprises a representation of join columns of those tables of the plurality of tables of the database that are associated with one or more joins of the join history and a representation of one or more weights between the join columns of those tables that are associated with the one or more joins;
selecting the one respective column from each of the plurality of tables as respective distribution columns of the plurality of tables that increase the amount of same values of the selected columns in co-located data for subsequent join operations at the plurality of storage locations according to a likelihood of individual ones of the two or more columns from different ones of the plurality of tables to be joined for database queries determined from the evaluation of the graph representation; and
returning respective identifiers of the selected columns.

6. The method of claim 5, further comprising:
obtaining the join history between the plurality of tables of the database; and
generating the graph representation of the join history.

7. The method of claim 6, wherein generating the graph representation of the join comprises creating or updating an edge in the graph for respective joins in the join history between respective tables joined in the join history, wherein the creation or update of the edge associates a weight value for the edge in the graph.

8. The method of claim 7, wherein the weight value is based, at least in part, on a cost to perform the join represented by the edge.

9. The method of claim 7, wherein selecting the respective columns comprises alternating between different recommendation sets to include a heaviest value of a weight value incidental to a randomly selected node in the graph, wherein columns identified in a recommendation set with a total heaviest value are identified as the selected columns.

10. The method of claim 5, wherein the request for respective columns is triggered as part of an operation to add or remove storage locations for the database.

11. The method of claim 10, further comprising redistributing the data amongst the plurality of storage locations according to the selected columns according to the changed storage locations for the database.

12. The method of claim 5, further comprising:
updating the graph based on additional join history obtained for the database; and
performing the selecting the respective columns from the plurality of tables according to the likelihood of the selected columns to be joined for database queries determined from an evaluation of the updated graph.

13. The method of claim 5, further comprising storing the data amongst the plurality of storage locations according to the selected columns.

14. A non-transitory, computer-readable storage medium, storing program instructions that when executed by one or more computing devices cause the one or more computing devices to implement:
responsive to a request that causes a selection of one respective column from each of a plurality of tables to distribute data of the plurality of tables in a database across each of a plurality of storage locations according to the one respective column, wherein the plurality of tables respectively comprise two or more columns:
evaluating a graph representation of join history between the plurality of tables to determine a likelihood of individual ones of the two or more columns from different ones of the plurality of tables to be joined for database queries, wherein the graph representation comprises a representation of join columns of those tables of the plurality of tables of the database that are associated with one or more joins of the join history and a representation of one or more weights between the join columns of those tables that are associated with the one or more joins;
selecting, based on the evaluation of the graph representation, the one respective column from each of the plurality of tables as respective distribution columns of the plurality of tables that increase the amount of same values of the selected columns in co-located data for subsequent join operations at the plurality of storage locations according to the determined likelihood of individual ones of the two or more columns to be joined for database queries; and
returning respective identifiers of the selected columns.

15. The non-transitory, computer-readable storage medium of claim 14, wherein the program instructions cause the one or more computing devices to further implement:
obtaining the join history between the plurality of tables of the database; and
generating a graph representation of the join history.

16. The non-transitory, computer-readable storage medium of claim 15, wherein, in generating the graph representation, the program instructions cause the one or more computing devices to implement creating or updating an edge in the graph for respective joins in the join history between respective tables joined in the join history, wherein the creation or update of the edge associates a weight value for the edge in the graph.

17. The non-transitory, computer-readable storage medium of claim 16, wherein, in evaluating the graph representation, the program instructions cause the one or more computing devices to implement alternating between different recommendation sets to include a heaviest value of a weight value incidental to a randomly selected node in the graph, wherein columns identified in a recommendation set with a total heaviest value are identified as the selected columns.

18. The non-transitory, computer-readable storage medium of claim 15, wherein, in obtaining the join history, the program instructions cause the one or more computing devices to implement receiving the join history from live database.

19. The non-transitory, computer-readable storage medium of claim 14, wherein the request for respective columns is received from a user of the database.

20. The non-transitory, computer-readable storage medium of claim 14, wherein the request for respective columns is triggered as part of an operation to upload new data to the database.

* * * * *